(12) United States Patent
Miesak et al.

(10) Patent No.: US 12,025,504 B2
(45) Date of Patent: Jul. 2, 2024

(54) NON-CONTACT TEMPERATURE MEASUREMENT SYSTEMS AND METHODS

(71) Applicant: L3Harris Technologies, Inc., Melbourne, FL (US)

(72) Inventors: Edward Miesak, Windermere, FL (US); Lawrence Blenke, St. Pete Beach, FL (US)

(73) Assignee: L3Harris Technologies, Inc., Melbourne, FL (US)

( * ) Notice: Subject to any disclaimer, the term of this patent is extended or adjusted under 35 U.S.C. 154(b) by 518 days.

(21) Appl. No.: 17/499,370

(22) Filed: Oct. 12, 2021

(65) Prior Publication Data

US 2023/0112390 A1    Apr. 13, 2023

(51) Int. Cl.
| | | |
|---|---|---|
| *G01K 5/50* | (2006.01) | |
| *G01B 11/16* | (2006.01) | |
| *G01K 1/024* | (2021.01) | |
| *G01K 5/48* | (2006.01) | |
| *G01K 11/12* | (2021.01) | |
| *G02B 27/09* | (2006.01) | |

(52) U.S. Cl.
CPC .............. *G01K 5/50* (2013.01); *G01B 11/165* (2013.01); *G01K 1/024* (2013.01); *G01K 5/48* (2013.01); *G01K 11/12* (2013.01); *G02B 27/0944* (2013.01)

(58) Field of Classification Search
CPC ............ G01K 5/48; G01K 5/486; G01K 5/50; G01K 5/52; G01K 5/56; G01K 1/02; G01K 1/024; G01K 11/12; G01K 11/125; G01K 11/32; G01K 11/3206; G02B 27/0944; G01B 11/165; G01J 5/00; G01J 5/02; G01J 5/0205; G01J 5/08; G01J 5/0806; G01J 5/0808; G01J 5/0813; G01J 5/0814; G01J 5/0815; G01J 5/0816
See application file for complete search history.

(56) References Cited

U.S. PATENT DOCUMENTS

| | | | | |
|---|---|---|---|---|
| 3,458,257 A | * | 7/1969 | Pryor .................. | G02B 27/4255 250/552 |
| 4,355,898 A | * | 10/1982 | Dakin .................... | G01K 11/12 374/E1.004 |
| 4,525,066 A | * | 6/1985 | Guillaume ............... | G01D 5/38 374/161 |

(Continued)

*Primary Examiner* — Gordon J Stock, Jr.
(74) *Attorney, Agent, or Firm* — Edell, Shapiro & Finnan, LLC

(57) ABSTRACT

Methods and systems for non-contact temperature measurement of an object on which is attached or etched a diffraction grating. The diffraction grating expands and contracts as the object expands and contracts upon there being a change in temperature of the object. Upon a light beam being received on the diffraction grating, the diffraction grating produces a pair of complementary light beams and one of the light beams is reflected back onto the diffraction grating and then onto the other light beam in a manner that causes the reflected light beam to propagate alongside and non-parallel to the other light beam. The resultant two light beams are thereafter impinged onto a camera at respective first and second impingement locations. The temperature of the object is then determined based on the separation distance between the first and second impingement locations.

20 Claims, 11 Drawing Sheets

(56) References Cited

U.S. PATENT DOCUMENTS

| | | |
|---|---|---|
| 6,603,559 B2 | 8/2003 | Tsao et al. |
| 7,369,156 B1 | 5/2008 | Heinke et al. |
| 9,909,925 B2 * | 3/2018 | Pan .......................... G01J 5/08 |
| 10,935,673 B2 * | 3/2021 | Van De Kerkhof ..... G01K 5/48 |

* cited by examiner

NON-CONTACT TEMPERATURE MEASUREMENT SYSTEMS AND METHODS

TECHNICAL FIELD

The present invention relates to non-contact temperature measuring systems and methods for measuring the temperature of an object.

BACKGROUND

Opportunities exist for a temperature measurement technology that can perform outside the capabilities of thermal-imaging and direct contact techniques such as fiber Bragg sensors and thermistors. Thermal imagers and IR sensors are common non-contact methods of temperature measurement. These have a limit on how low they can measure, about −60° C. (213.15° K, −76° F.) Fiber Bragg sensors are bulky and cumbersome to use. Thermistors need to be connected to an electrical circuit with associated electrical issues such as noise, interference, grounding, arcing, etc. Electrical wiring to physical sensors can result in additional heat transfer paths decreasing the accuracy of the readings as well as being cumbersome to use and complicating the task of measuring the temperature of a moving part.

SUMMARY

Disclosed herein are non-contact temperature measurement systems that can operate over wide temperature ranges as well as in environments that are not amenable to being measured using standard methods, i.e., individual jet engine turbine blades while the engine is running. It also can measure a wider range of temperatures than standard optical techniques.

The systems and methods disclosed herein use an optical diffraction grating as a temperature sensor. As the temperature of the grating changes so does its line spacing and therefore it's diffraction characteristics. According to one implementation, this change in diffraction is monitored by a single light beam and recorded by a single camera, e.g. a charge coupled device (CCD). According to other implementations multiple light beams and multiple cameras are utilized to allow a wider range of temperatures to be monitored.

A diffraction grating is an optical component with a periodic structure that diffracts light into several beams propagating in different directions. The directions of the diffracted beams depend on the orientation of the grating, the wavelength of light impinging upon the grating, and the spacing of the periodic structure in the grating, i.e. line spacing.

According to one implementation, a helium neon laser impinges on the optical grating at normal incidence. The diffracted beams of same order are symmetric about the incident beam as shown in FIG. 1A. The number of each diffracted beam is its order. With reference to FIG. 1A, in other words, $\theta_{+1} = -\theta_{-1}$ and $\theta_{+2} = -\theta_{-2}$. Monitoring the position of each diffraction order will give information about the system. For instance, if the wavelength and angle of the laser and the orientation of the grating are all held constant, the position of the diffraction orders can be used to determine the density of the periodic structure of the grating. The density of the grating structure is related to temperature through its coefficient of thermal expansion. Therefore, the position of the diffraction orders can be used to measure temperature.

Measuring the absolute value of a diffracted beam position is replete with difficulties. A much easier measurement to make is the movement of one order relative to another order. This is done by using one mirror to reflect an order to its complimentary order. The two combined orders can be sent to a camera, such as a CCD, where the distance between them is determined.

According to one implementation a system for non-contact temperature measurement of an object is provided that includes a light source that is configured to emit a light beam (e.g. a laser beam). A diffraction grating attached to or etched in the object is configured to receive the light beam and to produce a positive order light beam and a negative order light beam that are complementary to one another. According to one implementation, the diffraction grating is constructed such that the diffracted positive and negative order light beams propagate in a common plane that is parallel to a horizontal x-axis of the grating. A mirror or other reflective medium is arranged to reflect the negative order light beam back onto the diffraction grating. The mirror and diffraction grating are collectively arranged and configured to cause the reflected negative order light beam to propagate alongside and non-parallel to the positive order light beam such that a separation exists between them with respect to the vertical y-axis. This results in there being an angular displacement between the reflected negative order light beam and the positive order light beam with any separation in the x-axis being the result of an expansion or contraction of the diffraction grating. It is an angular orientation of the mirror that results in the reflected negative order light beam being displaced from the positive order light beam in the y-axis.

The system also includes a camera, such as a CCD, that has an image sensor that is configured to simultaneously receive the positive order light beam and the reflected negative order light beam. The image sensor also includes x and y axes that are respectively arranged parallel to the x and y axes of the diffraction grating discussed above. By virtue of the reflected negative order light beam and the positive order light beam being angularly separated from one another along they axes, a separation distance exists between them at the locations they impinge on the image sensor of the camera. In particular, the two beams are separated at the image sensor by a first distance along the x-axis and a second distance along the y-axis. The first distance is attributable to the thermal expansion or contraction of the diffraction grating. As explained below, this first distance is used to determine the temperature of the object whose temperature is being measured. The second distance is attributable to the angular orientation of the mirror used to reflect the negative order light beam onto the positive order light beam as mentioned above. The existence of the second distance produces a clear distinction between the two beams received on the image sensor of the camera.

The system further includes means for determining the first distance between the first and second impingement locations on the image sensor of the camera that are respectively associated with the positive order light beam and the reflected negative order light beam. As will be discussed in more detail below, by having previously established a correlation between light beam separation distances along the x-axis on the image sensor of the camera with known temperatures of the object, the first distance determined by use of the camera can be used to ascertain the temperature of the object.

As used in the preceding paragraph, and in other parts of this disclosure, the terms "positive order" and "negative order" are used to distinguish between pairs of complementary orders and may be used interchangeably. For example, the non-contact measuring system described in the preceding paragraph may instead embody a mirror that is arranged to reflect the positive order light beam back onto the diffraction grating in a manner that causes the reflected positive order light beam to propagate alongside and non-parallel to the negative order light beam. Thus, any interchangeable use of the terms "positive order" and "negative order" falls within the scope of this disclosure and within the scope of the appended claims.

Because the diffraction grating, the image sensor of the camera and other components of the system disclosed herein may assume any of a number of angular orientation, it is important to note that the orthogonally arranged x and y axes disclosed herein are not respectively required to be horizontally and vertically oriented. That is, the axis systems disclosed herein may assume different rotation orientations based on the rotation orientations of the components of the system.

According to some implementations the system also includes a plurality of mirrors that are each disposed in an optical pathway of the positive order light beam and the reflected negative order light beam. The plurality of mirrors is arranged with respect to one another to cause an increase in the distance traveled by the positive order light beam and the reflected negative order light beam before being received in the camera. This advantageously increases the length of the optical pathway of the positive order light beam and the reflected negative order light so that a more discernable separation distance of the two light beams is achieved at the camera impingement locations.

The separation distance of the light beams impinging on the camera will vary as the temperature of the object changes as a result of there being an expansion or contraction of the object. The expansion and contraction of the object causes an alteration in the line spacing of the diffraction grating. The resultant separation distance of the light beams impinging on the camera are attributable to this change in grating line spacing.

The non-contact nature of the temperature measurement system makes it amenable to measuring the temperature of very low mass objects by the omission of heat flow paths generally associated with prior temperature measurement systems. The system is also suitable for measuring the temperature of objects located in confined spaces. Another advantage of the systems disclosed herein is that they are inherently self-calibrating. That is, because the positive and negative order light beams are diffracted by a common diffraction grating that is attached to a single object, any movement (e.g. vibrations) of the parts will have an equal effect on each of the positive and negative order light beams. As such, the system can measure temperatures accurately even when the object is subject to vibrations.

As will be discussed in more detail below, according to other implementations the same techniques can be employed to determine the amount an object expands or contracts as the temperature of the object changes.

These and other advantages and features will become evident in view of the drawings and detailed description.

DETAILED DESCRIPTION

Figure 1A:
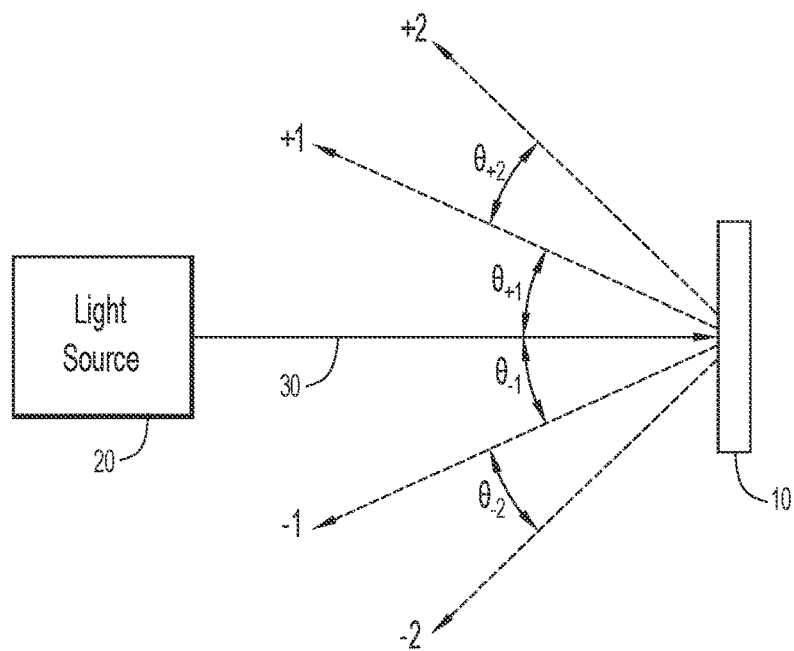
FIGS. 1A and 1B respectively show a top view and a perspective view of a reflection grating that produces two order pairs of diffractive light beams.
Figure 1B:
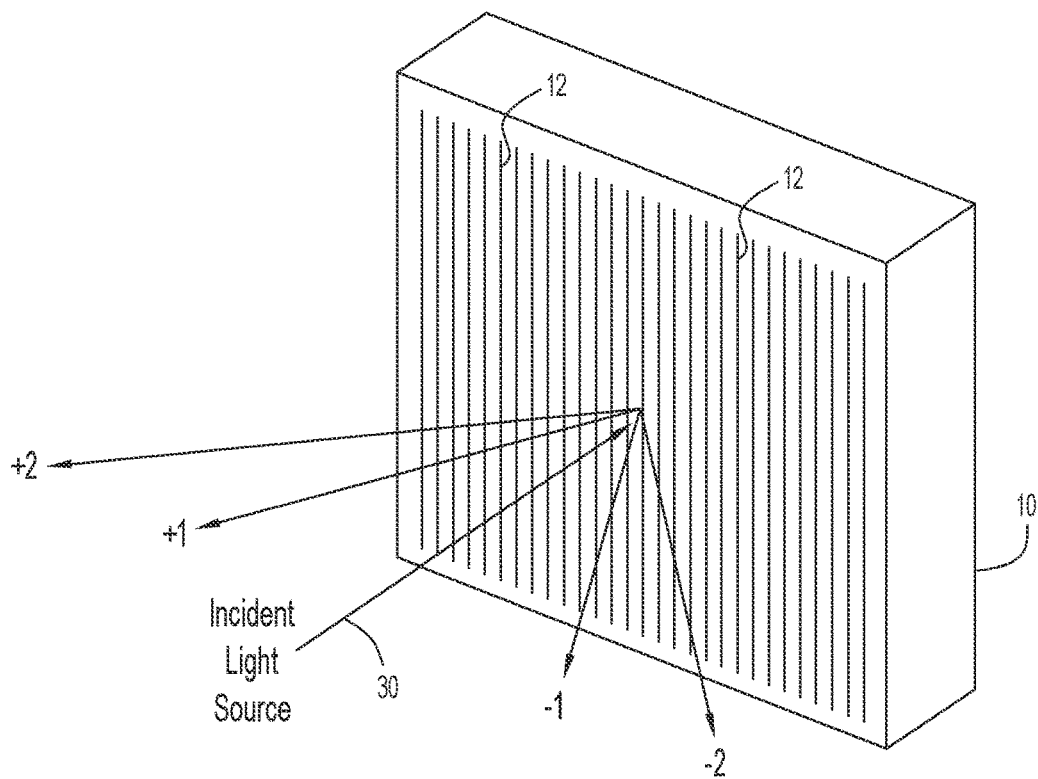
Figure 2:
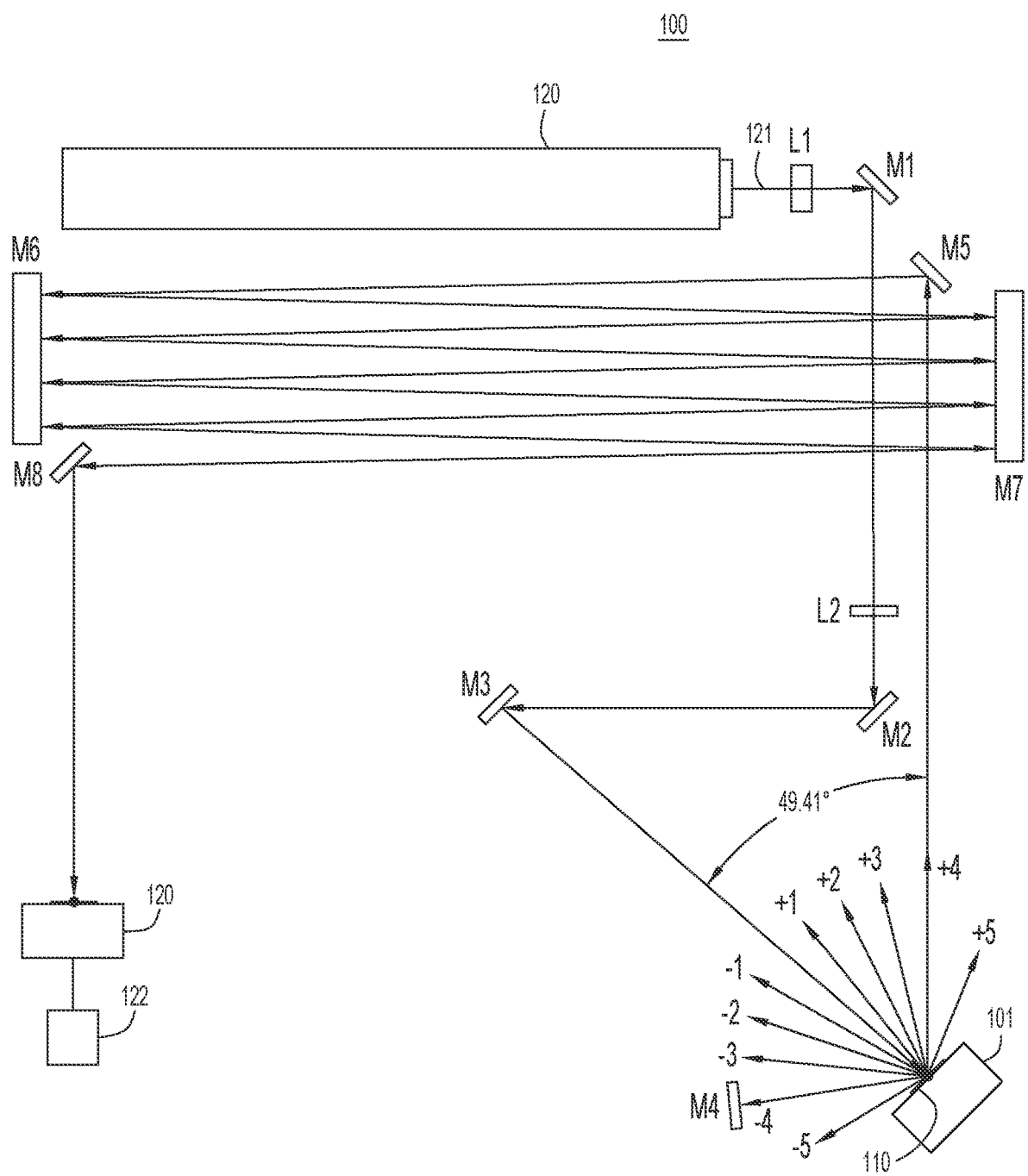
FIG. 2 illustrates a system for non-contact temperature measurement of an object according to one implementation.

Optical gratings can be used to produce from an incident light beam one or more order pairs of light beams. FIGS. 1A and 1B respectively illustrate perspective and top views of a reflection grating 10 that possesses a plurality of side-by-side vertically oriented grating lines 12 that are configured to produce at least a first order pair of light beams, +1, −1 and a second order pair of light beams +2, −2 upon a light beam 30 emitted by a light source 20 impinging on the grating lines. The first and second order pairs of light beams are produced upon the light beam 30 striking the surface of the grating at an angle normal to its surface. In the example of FIGS. 1A and 1B, the grating is constructed such that the diffracted light beams +1, −1, +2, −2 propagate in a common plane that is parallel to the horizontal axis "x". The terms "order pair of light beams" or "complementary light beams" is used herein to denote first and second light beams that propagate in a common plane and in equal but opposite angular directions with respect to the incident angle of light beam 20. FIGS. 1A and 1B depict such orientations in which the following grating equation applies:

$$\eta\lambda = d(\mathrm{Sin}[\theta] + \mathrm{Sin}[\theta^{1}])$$

where,
η=diffraction order
λ=light wavelength
d=grating line spacing
θ=angle of incidence of light beam striking the grating measured from grating normal
$\theta^{1}$=angle of diffraction measured from grating normal FIG. 2 depicts a system 100 for non-contact temperature measurement of an object 101 that expands and contracts with a change in temperature of the object. Attached to or etched into the object 101 is a reflection grating 110 that may be similar to that depicted in FIGS. 1A and 1B, although other types of diffraction gratings may be used as will be discussed in more detail below. In the example of FIG. 2, the reflection grating 110 includes vertically oriented grating lines (not shown) that are spaced to produce at least five order pairs of light beams +1, −1; +2, −2; +3, −3; +4, −4 and +5, −5. It is appreciated that the reflection grating may be configured more or fewer than five order pairs of light beams. Similar to the propagation of the first and second order pairs discussed above in conjunction with FIGS. 1A and 1B, each of the five order pairs of light beams depicted in FIG. 2 propagates along a horizontal plane that is parallel to a horizontal x-axis of the grating 110. In use, the diffraction grating 110 is attached to or etched on the object 101 and is configured to expand and contract as the object expands and contracts so that spacing between the grating lines change with a change in temperature of the object.

Figure 3A:
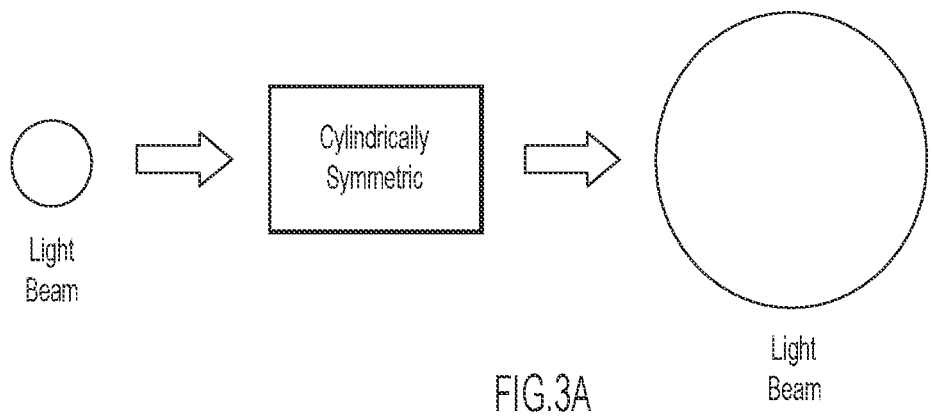
FIGS. 3A-C illustrate light beam profiles produced by cylindrically symmetric and non-cylindrically symmetric telescopes.
Figure 3B:
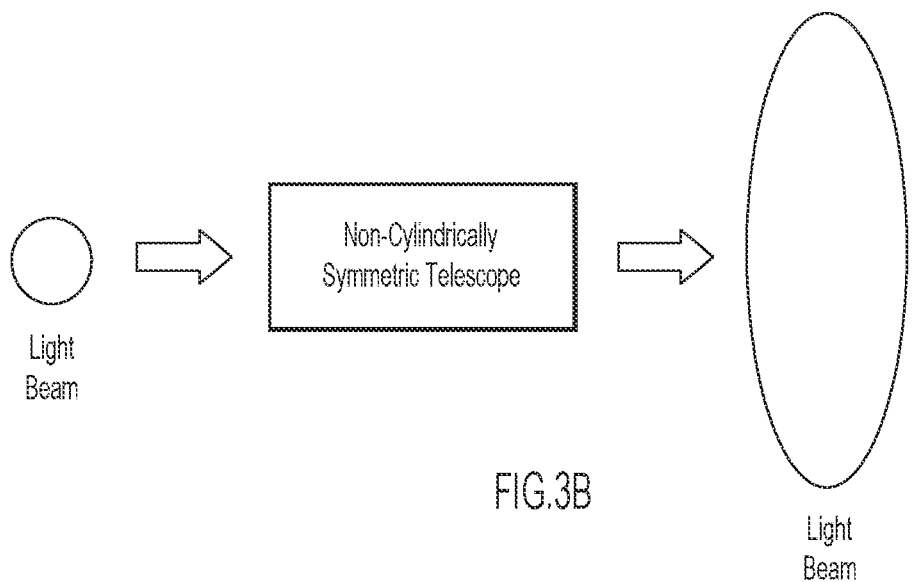
Figure 3C:
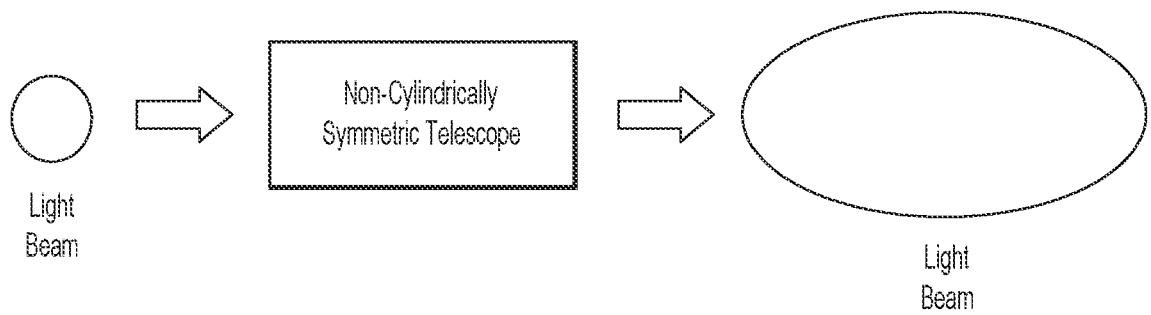

The system includes a light source 120 that emits a light beam 121. In the example of FIG. 2, mirrors M1, M2 and M3 direct the emitted light beam 121 to cause it to impinge on the reflection grating at an angle that is normal to the surface of the grating. According to other implementations, the light beam 121 is caused to impinge on the reflection grating at an angle that is not normal to the surface of the grating. Also disposed between the laser 120 and the reflection grating 110 is a series of lenses L1 and L2 that together form a telescope that is configured to shape the light beam 121 prior to it striking the grating. According to some implementations, a circularly symmetric telescope is used to shape the light beam 121 equally along orthogonal axes so that the light beam maintains a circular profile as shown in FIG. 3A. According to other implementations, a non-circularly symmetric telescope is used to shape the light beam 121 and to alter its shape so that it possesses an elliptical profile as shown in FIG. 3B or FIG. 3C. As will be discussed in more detail below, the use of a non-circularly symmetric telescope can advantageously increase the accuracy of the system under certain circumstances. In any event, a processing of the light beam 121 by the telescope readies it to impinge on multiple grating lines to produce multiple order pairs of light beams. In use, this allows a user to select a particular order pair of light beams best suited for determining the temperature of the object 101. The particular order pair of light beams are typically those having the highest resolution among the plurality of order pairs. In the example of FIG. 2, the fourth order pair of light beams +4, −4 is utilized in determining the temperature of object 101.

System 100 also includes a mirror M4, or other reflective medium, that is arranged to reflect the −4 light beam back onto the reflection grating 110. The mirror M4 and reflection grating 110 are collectively arranged and configured to cause the reflected negative −4 light beam to propagate alongside and non-parallel to the +4 light beam. This results in there being an angular displacement between the reflected −4 light beam and the +4 light beam.

According to one implementation, the reflection grating is constructed such that the diffracted +4 and −4 light beams propagate in a common plane that is parallel to a horizontal x-axis of the grating. And as stated above, the mirror M4 is arranged to reflect the −4 light beam back onto the reflection grating so that the reflected −4 light beam propagates alongside and non-parallel to the +4 light beam such that a separation exists between them with respect to the vertical y-axis. This results in there being an angular displacement between the reflected −4 light beam and the +4 light beam with the separation in the x-axis being the result of an expansion or contraction of the reflection grating. According to some implementations, the mirror M4 may additionally cause there to be a degree of separation in the x-axis.

The system also includes a camera 120, such as a CCD, that has an image sensor that is configured to simultaneously receive the +4 light beam and the reflected −4 light beam. The image sensor also includes x and y axes that are respectively arranged parallel to the x and y axes of the reflection grating. By virtue of the reflected −4 light beam and the +4 light beam being angularly separated from one another in both the x and y axes, a separation distance exists between them at the locations they impinge on the image sensor of the camera 120. In particular, the two beams are separated at the image sensor by a first distance along the x-axis and by a second distance along the y-axis. The first separation distance is attributable to the thermal expansion or contraction of the reflection grating, and as will be discussed below, is used in determining the temperature of the object 101. The second separation distance is attributable to the angular orientation of the mirror M4 that is used to reflect the −4 light beam onto the +4 light beam as described above. The existence of the second separation distance along the y-axis produces a clear distinction between the two beams received on the image sensor of the camera 120. As will be discussed in more detail below, by having previously established a correlation between the first separation distance between the +4 light beam and the reflected −4 light beam along the x-axis of the image sensor of the camera 120 with known temperatures of the object 101, the first separation distance observed by the camera 120 can be used to ascertain the temperature of the object 101.

Figure 4A:
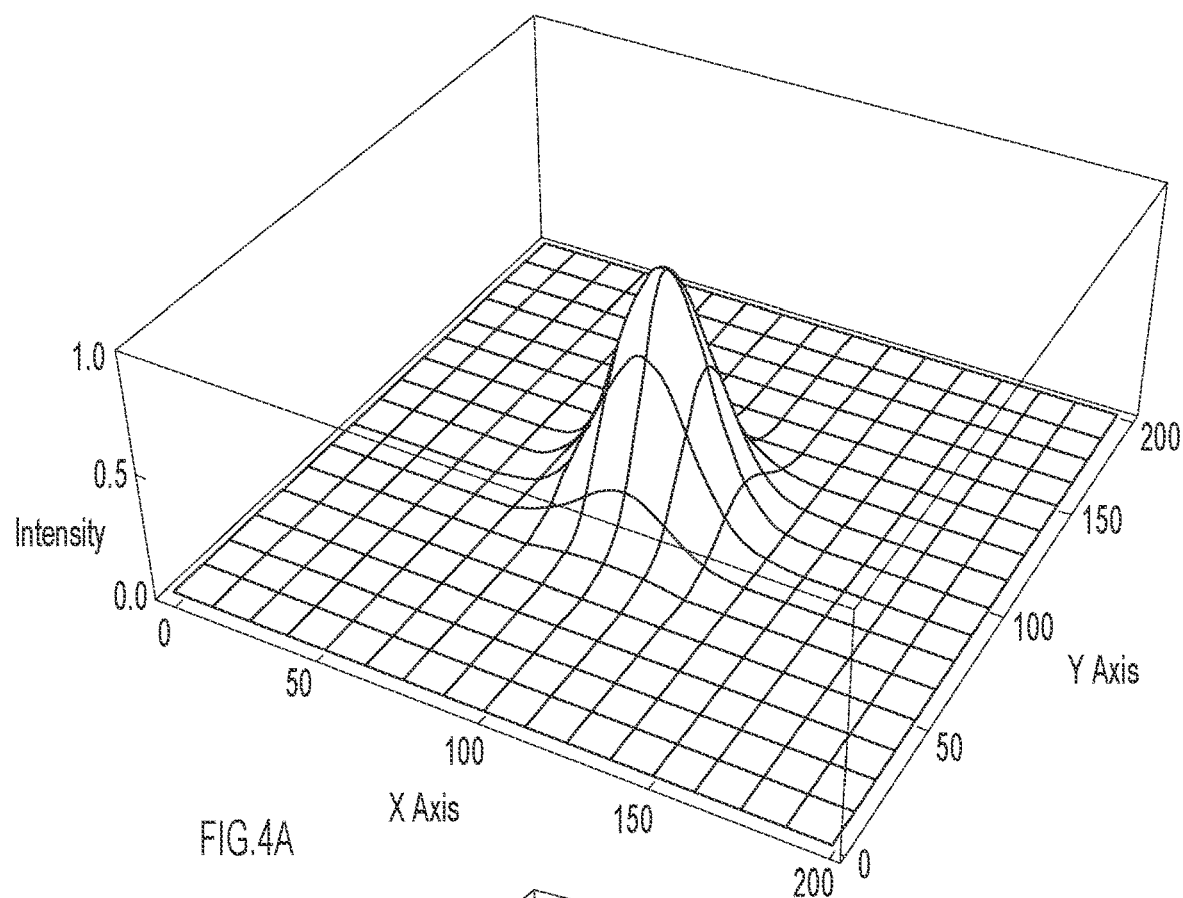
FIG. 4A depicts a camera image of a light beam.
Figure 4B:
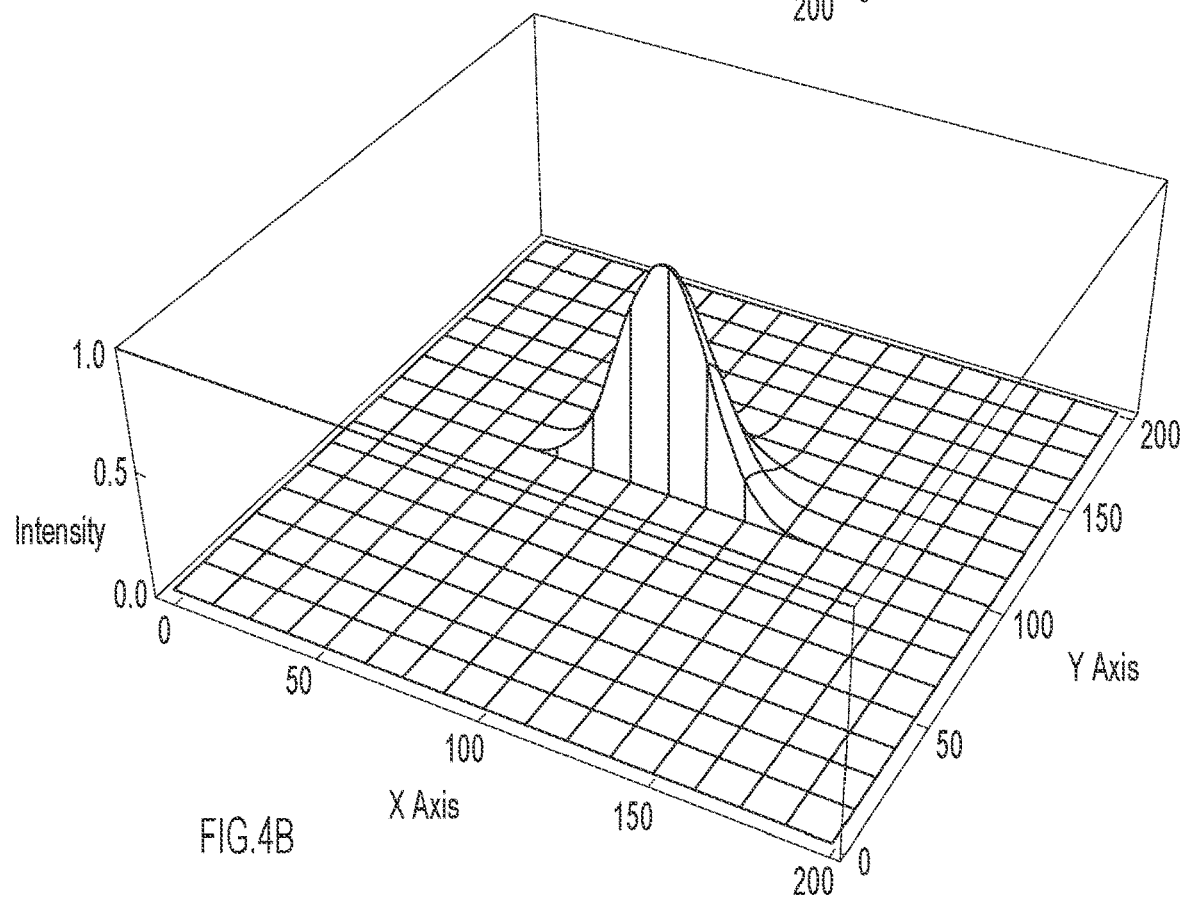
FIG. 4B shows a cross-section of the light beam of FIG. 4A.
Figure 4C:
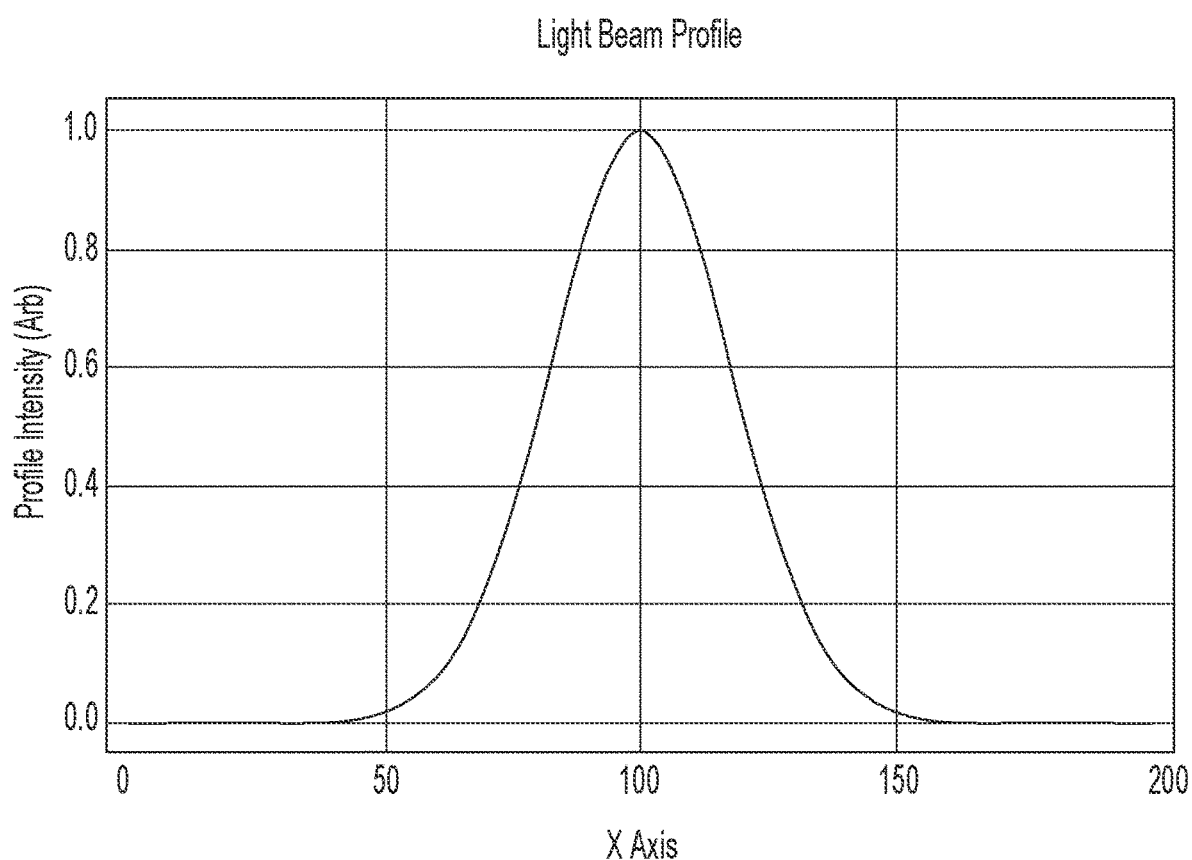
FIG. 4C shows a profile of the cross-section of the light beam shown in FIG. 4B.

FIG. 4A depicts a representation of a light beam (e.g. laser beam) displayed by a camera. The x-axis and y-axis display the lateral extent or size of the beam. The z-axis is displayed as a third dimension giving the illusion that the beam profile is three dimensional. In fact, the z-axis displays the intensity of the light beam. Software implemented in the camera allows a user to slice through the centroid (center of mass) of the beam parallel with the x-axis as shown in FIG. 4B. The resulting slice through the light beam is displayed in FIG. 4C as an intensity profile.

Figure 5:
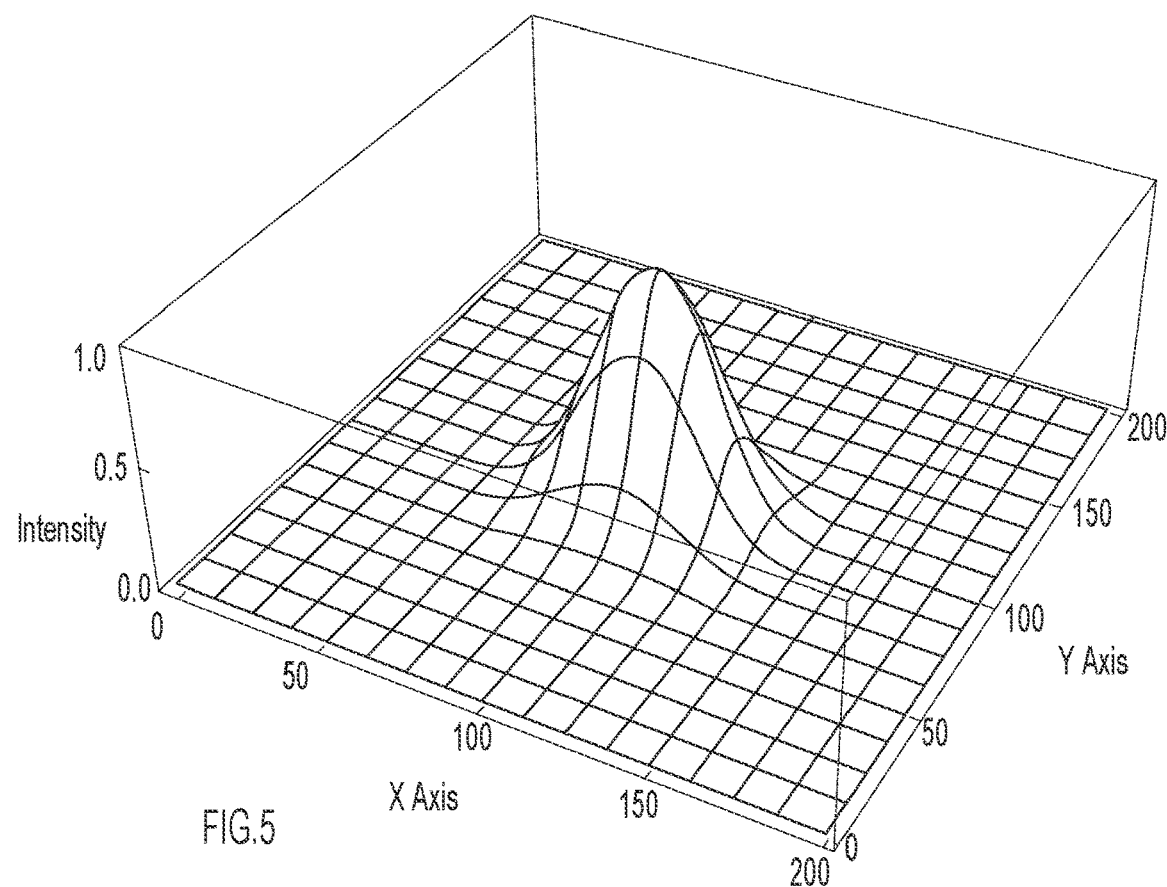
FIG. 5 depicts a camera image of two overlapping light beams that are separated along the x-axis but not on the y-axis.

FIG. 5 shows a camera display of two overlapped light beams that are slightly separated along the x-axis. At this separation distance the two beams cannot be distinguished as two beams by the camera 120. That is, the image appears to be a single beam.

Figure 6A:
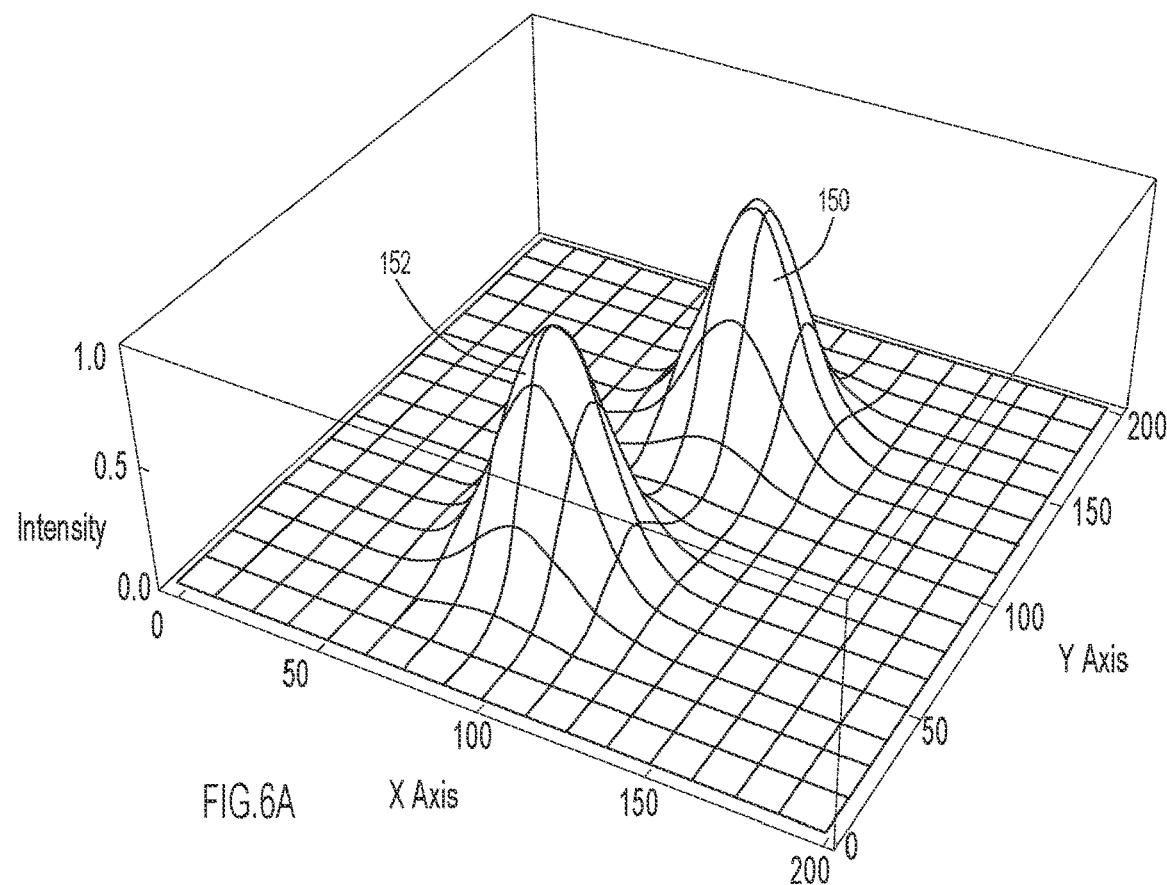
FIG. 6A shows the same overlapping light beams of FIG. 5 with the two light beams also being separated along the y-axis.
Figure 6B:
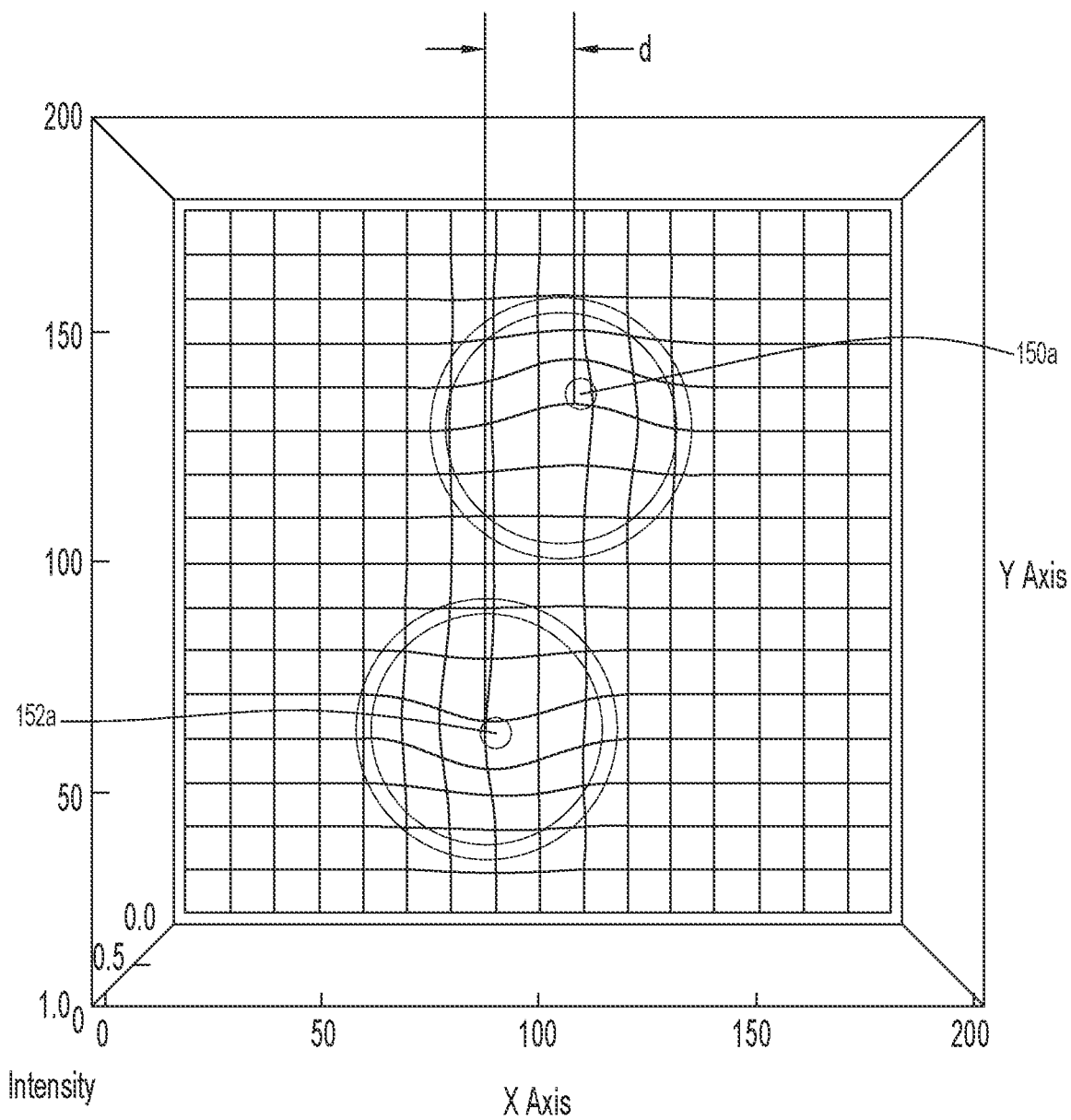
FIG. 6B is a top view of the light beams depicted in FIG. 6A.

In regard to the example system and method of FIG. 2, FIG. 6A shows the +4 light beam 150 and the reflected −4 light beam 152 separated along the x-axis of the image sensor of the camera 120 like that shown in FIG. 5. However, the light beams 150 and 152 are also separated along the y-axis of the image sensor, making them clearly distinguishable as two light beams by the camera 120. Separating the two light beams 150 and 152 along the y-axis of the image sensor allows the camera software to more easily calculate the distance d between their centroids 150a and 152a along the x-axis as shown in FIG. 6B. As discussed above, the mirror M4 is angularly oriented to specifically cause the −4 light beam to be separated from the +4 light beam along the y-axis of the image senor of the camera 120.

Figure 7:
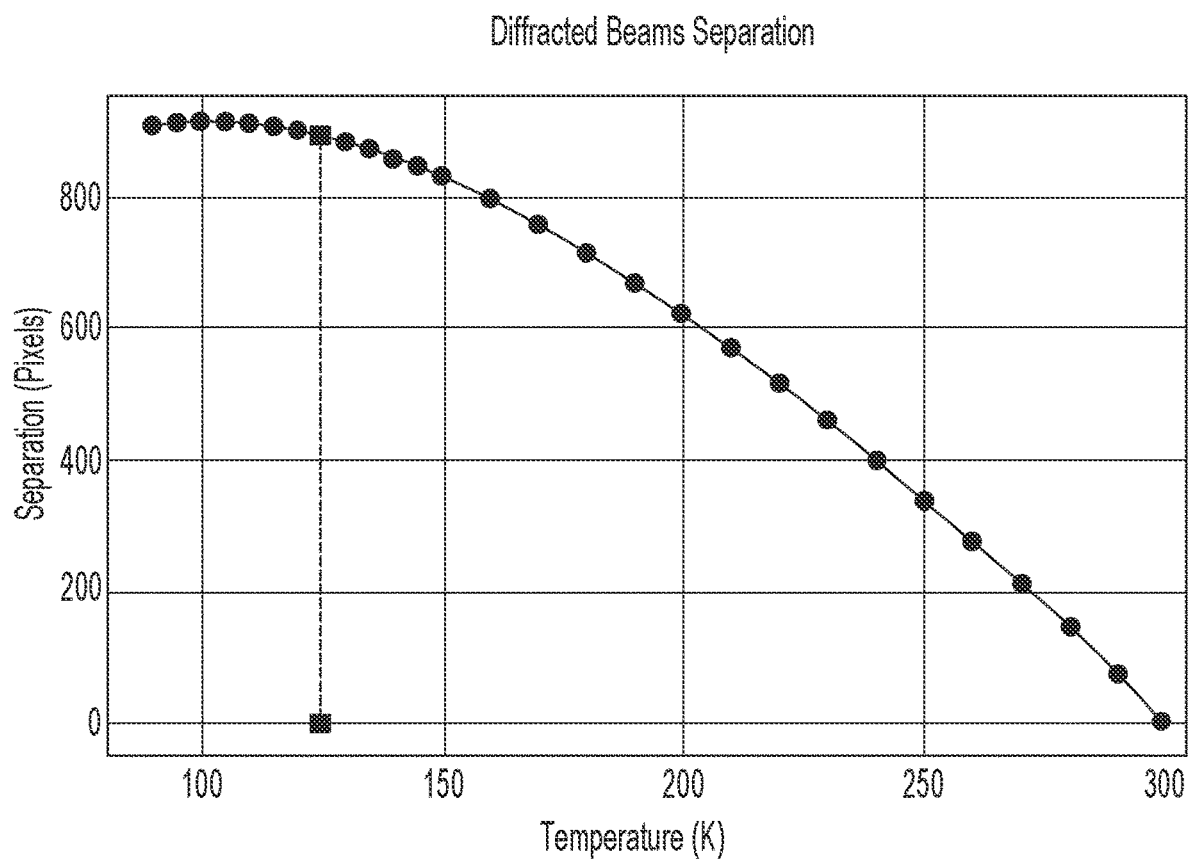
FIG. 7 is a graph showing a correlation of measured separation distances of two light beams received in a camera with known temperatures of an object.

In order to determine the temperature of the object 101 based on a measured separation distance of the two light beam centroids 150a and 152a along the x-axis of the image senor of the camera 120, it is necessary to have previously correlated measured separation distances with known temperatures of the object 101. FIG. 7 is a graphical representation of one such exercise wherein an extrapolation between data points provides a continuous correlation between light beam separation distances d and the temperature of the object 101. According to one implementation, the derived data is stored in an electronic storage medium of the camera 120 or of a device 122 communicating with the camera. In some instances, the data is electronically stored in a tabular format (e.g. a lookup table), while in other instances the data is represented as one or more mathematical equations embodied in software executable in the camera 120 or in the associated device 122. Determining the temperature of the object 101 based on a separation distance between the camera impingement locations of the +4 light beam and the reflected −4 light beam can therefore be achieved by comparing the measured separation distance with the electronically stored data or by a solving of the one or more mathematical equations after having obtained the measured separation distance d of the light beams. Rudimentary methods may also be used to determine the temperature of the object. For example, a user may visually utilize a lookup table to compare measured separation distances d with known object temperatures, or may solve by himself/herself the one or more mathematical equations after having obtained the measured separation distance d.

As illustrated in FIG. 2, according to some implementations the system 100 also includes a plurality of mirrors M6 and M7 that are disposed in an optical pathway of the +4 light beam and the reflected −4 light beam. The mirrors are arranged with respect to one another to cause an increase in the distance traveled by the +4 light beam and the reflected −4 light beam before they are received in the camera 120. This advantageously increases the length of the optical pathway of the +4 light beam and the reflected −4 light beam so that a more discernable separation distance of the two light beams is achieved at the camera. According to some implementations, the increase in travel distance obtained by the use of mirrors M6 and M7 is in a range of 15 to 30 feet.

Figure 8:
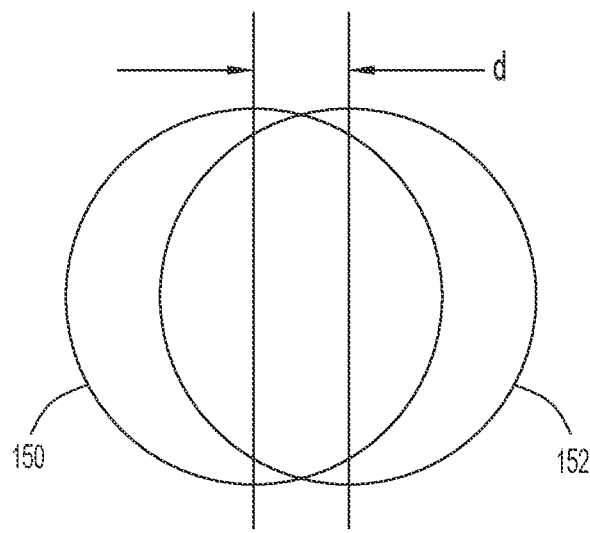
FIG. 8 illustrates cylindrical profiles of two overlapping light beams separated by distance d.
Figure 9:
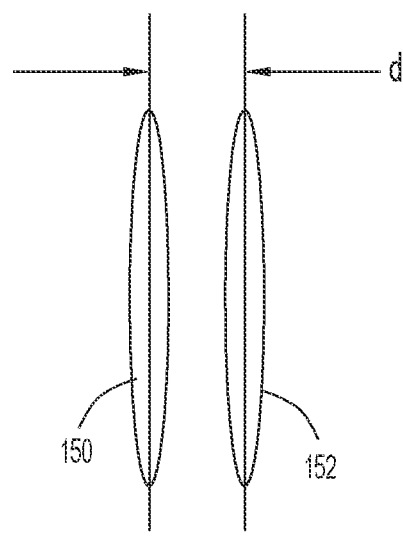
FIG. 9 illustrates elliptical profiles of two light beams separated by the same distance d shown in FIG. 8.

As disclosed above, system 100 may include a circularly symmetric telescope or a non-circularly symmetric telescope. FIG. 8 illustrates profiles of the +4 light beam 150 and reflected −4 light beam 152 received in camera 120 upon a circularly symmetric telescope being used. FIG. 9 illustrates profiles of the +4 light beam 150 and reflected −4 light beam 152 received in camera 120 upon a non-circularly symmetric telescope being used. As is apparent in FIGS. 8 and 9, the separation distance d between beams 150 and 152 is more readily apparent with the thin elliptical profiles produced by the non-circularly symmetric telescope. Use of the non-circularly symmetric telescope can therefore advantageously increase the accuracy of the system 100.

Figure 10:
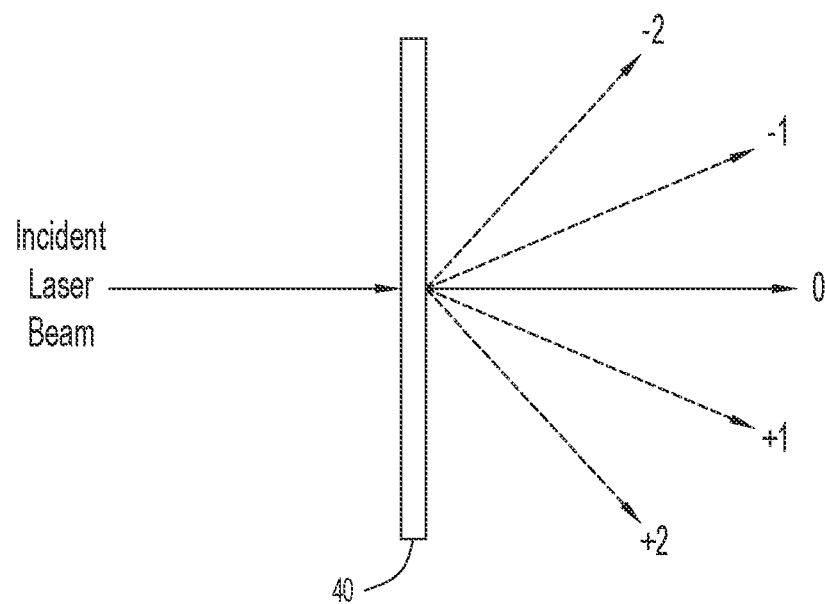
FIG. 10 illustrates a working transmission grating.
Figure 11:
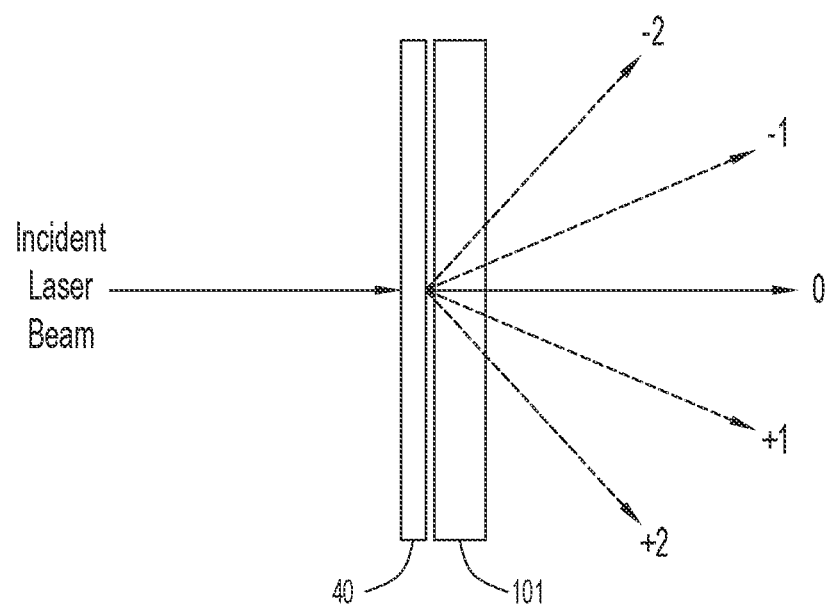
FIG. 11 illustrates the working of a transmission grating attached to a side surface of a transparent object.

In the example of FIG. 2, a reflection grating is used to produce diffracted order pairs of light beams. However, according to other implementations a transmission grating 40, like that shown in FIG. 10, is used in which an incident light beam impinges on a first side of the grating and diffracted order pairs of light beams +1, −1 and +2, −2 emerge from a second side of the grating opposite the first side. According to one implementation, a transmission grating is used to measure the temperature of a transparent object 102 in a manner similar to the system of FIG. 2. That is, at least one order pair of light beams diffracted by the grating 40 may be manipulated and delivered to camera 120 in a manner consistent with the techniques utilized in the system of FIG. 2. A difference is that the order pairs of light beams +1, −1 and +2, −2 produced by the transmission grating are first caused to emerge from the second side of the grating 40 and to be directed through the transparent object 102 before being manipulated and directed onto camera 120.

Figure 12:
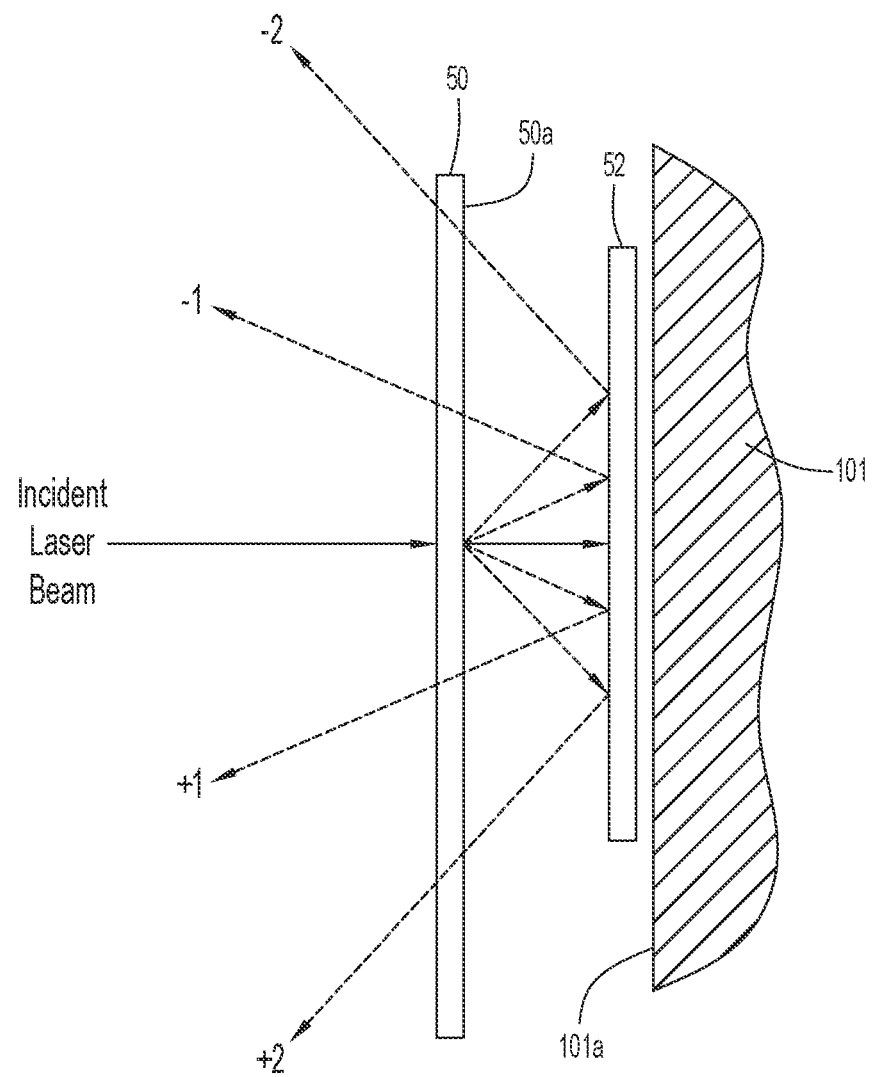
FIG. 12 illustrates the working of a transmission grating attached to a side surface of an opaque object.

FIG. 12 illustrates a partial exploded view of an assembly wherein a temperature sensor in the form of a transmission grating 50 and a mirror 52 is attached to a surface 101a of the object 101. In use the transmission grating 50 is arranged directly on top of the mirror 52 so that order pairs of light beams exiting a backside 50a of transmission grating are reflected by the mirror in a direction away from the surface 101a of the object 101 and back through the grating. As with the systems and methods discussed above, a temperature of the object 101 is determinable by a manipulation of one of the order pairs +1, −1 and +2, −2 so that when the order pair of light beams are received on an image sensor of the camera 120, a separation distance d along an x-axis of the image sensor is detectable. With continued reference to FIG. 12, according to other implementations the mirror 52 is dispensed with and the surface of the object 101 that faces the transmission grating 50 is polished so that it acts as a mirror.

In the foregoing disclosure, non-contact temperature measurement systems and methods are disclosed for determining the temperature of an object on which is etched or bonded a diffraction grating. When the coefficient of thermal expansion (CTE) of an object is known, the techniques disclosed above can also be used to determine an amount of thermal expansion or contraction of the object as the temperature of the object changes. This is accomplished by having previously established a correlation between light beam separation distances at the camera with known expansion and contraction states of the object.

Although only a number of examples have been disclosed herein, other alternatives, modifications, uses and/or equivalents thereof are possible. Furthermore, all possible combinations of the described examples are also covered. Thus, the scope of the present disclosure should not be limited by the particular examples disclosed herein.

What is claimed is:

1. A system for non-contact temperature measurement of an object that expands and contracts with a change in temperature of the object, the system comprising:
   a light source configured to emit a light beam;
   a diffraction grating including grating lines, the diffraction grating attached to or etched on the object, the diffraction grating configured to expand and contract as the object expands and contracts so that spacing between the grating lines change with a change in temperature of the object, the diffraction grating configured to receive the light beam and to produce an order pair of first and second light beams;
   a mirror arranged to reflect the first light beam back onto the diffraction grating, the mirror and diffraction grating being configured to cause the reflected first light beam to propagate alongside and non-parallel to the second light beam;
   a camera configured to simultaneously receive the reflected first light beam and the second light beam at respective first and second impinging locations; and
   means for determining the temperature of the object based on a separation distance between the first and second impingement locations.

2. The system according to claim 1, further comprising a plurality of mirrors disposed in an optical pathway located between the diffraction grating and the camera, the plurality of mirrors being arranged with respect to one another to cause an increase in distance traveled by the reflected first light beam and the second light beam before being received in the camera.

3. The system according to claim 1, wherein the diffraction grating is a reflective grating.

4. The system according to claim 1, wherein the diffraction grating is a transmission grating.

5. The system according to claim 1, wherein the camera is a charge coupled device.

6. The system according to claim 1, further comprising a telescope located in an optical pathway between the light source and diffraction grating that expands the light beam emitted by the light source.

7. The system according to claim 1, wherein the light beam is a laser beam.

8. The system according to claim 1, wherein the diffraction grating diffracts the first and second light beams in a horizontal plane.

9. The system according to claim 1, wherein the diffraction grating diffracts the first and second light beams in a vertical plane.

10. The system according to claim 1, further comprising an optical filter located in an optical flow path of the reflected first light beam and the second light beam, the optical filter configured to permit a particular wavelength of the reflected first light beam and the second light beam to pass onto the camera.

11. A method for non-contact temperature measurement of an object on which is attached or etched a diffraction grating, the diffraction grating configured to expand and contract as the object expands and contracts with a change in temperature of the object, the method comprising:

directing a light beam onto the diffraction grating to produce an order pair of first and second light beams;

reflecting the first light beam back onto the diffraction grating in a manner that causes the reflected first light beam to propagate alongside and non-parallel to the second light beam;

impinging the reflected first light beam and the second light beam onto a camera at respective first and second impingement locations;

determining a separation distance between the first and second impingement locations; and determining the temperature of the object based on the determined separation distance.

12. The method according to claim 11, further comprising reflecting the reflected first light beam and the second light beam with the use of a plurality of mirrors disposed in an optical pathway located between the diffraction grating and the camera to cause an increase in distance traveled by the reflected first light beam and the second light beam before being received in the camera.

13. The method according to claim 11, wherein the diffraction grating is a reflective grating.

14. The method according to claim 11, wherein the diffraction grating is a transmission grating.

15. The method according to claim 11, wherein the camera is a charge coupled device.

16. The method according to claim 11, further comprising expanding the light beam emitted by the light source by the use of a telescope.

17. The method according to claim 11, wherein the light beam is a laser beam.

18. The method according to claim 11, wherein the diffraction grating diffracts the positive order light beam and negative order light beam in a horizontal plane.

19. The method according to claim 11, wherein the diffraction grating diffracts the positive order light beam and negative order light beam in a vertical plane.

20. The method according to claim 11, further comprising placing an optical filter in an optical flow path of the reflected first light beam and of the second light beam, the optical filter configured to permit a particular wavelength of the reflected first light beam and of the second light beam to pass onto the camera.

* * * * *